Oct. 26, 1954    E. K. CLARK ET AL    2,692,957
PERMANENT MAGNET TYPE GENERATOR
Filed June 4, 1945    3 Sheets-Sheet 1

WITNESSES:
E. L. Oberlin

INVENTORS
Earl K. Clark and
Theodore C. Appleman.
BY
Paul E. Friedemann
ATTORNEY

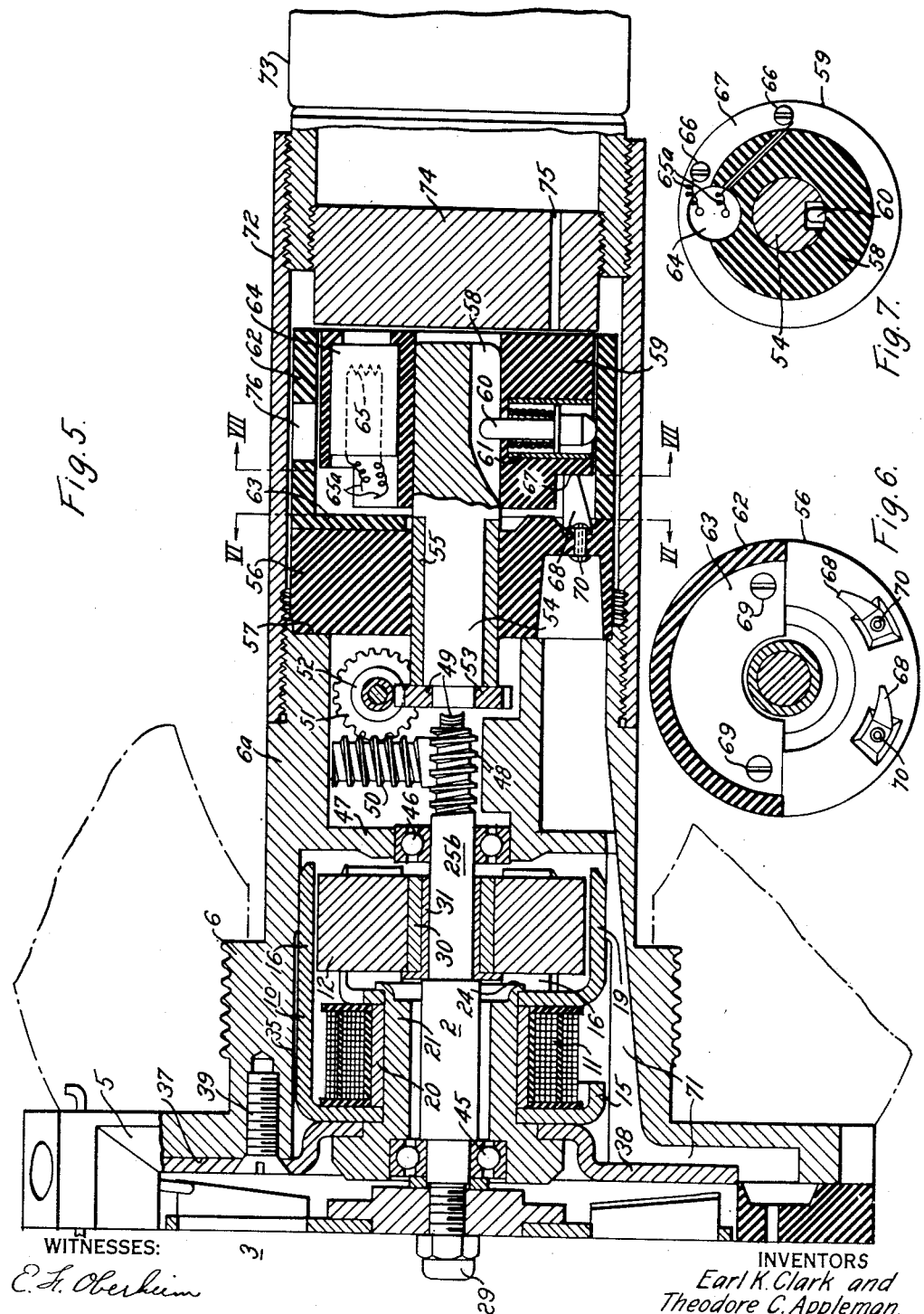

Patented Oct. 26, 1954

2,692,957

UNITED STATES PATENT OFFICE 2,692,957

PERMANENT MAGNET TYPE GENERATOR

Earl K. Clark and Theodore C. Appleman, Mansfield, Ohio, assignors, by mesne assignments, to the United States of America as represented by the Secretary of the Navy Application June 4, 1945, Serial No. 597,577

2 Claims. (Cl. 310—156)

This invention relates generally to ordnance fuses and more particularly to electrically operated ordnance fuses which are adapted for detonation in proximity to their objective.

In certain of its aspects, this invention is related to a copending application of R. N. Harmon and E. J. Naumann, Serial No. 597,573, filed on the same date as this application, entitled Electrically Operated Devices, and assigned to the same assignee as this invention.

While this invention in its specific illustration and disclosure is directed to ordnance fuses, it will be apparent to one skilled in the art that the teachings hereof are not limited to the specific application but are of a general nature.

In the development of electrically operated fuses, it has been found that in most cases, batteries are entirely unsatisfactory as the electric energy source for the electrical system of the fuse. They are easily damaged by moisture and temperature extremes, they must have high voltage for their size and, hence, have a short storage life, and when connected in a fuse circuit if a short circuit exists, immediate ignition of the fuse may result. Experimenting, made with small generators as the energy source in electric fuses has resulted in the complete elimination of the difficulties encountered with batteries. There are, however, many problems in the use of generators. These involve the size of the generator assembly, its electrical output for a given size, and its design for ease of manufacture, to mention a few.

One object of this invention is to provide an improved type of ordnance fuse.

Another object of this invention is to provide an ordnance fuse embodying a generator and other arming features which is simple in its elements and easily assembled.

Another object of this invention is to provide a generator assembly which is simple in its elements.

Another object of this invention is to provide a generator assembly which is easily manufactured and assembled.

A further object of this invention is to provide a generator assembly which has a high electrical output for its size and which in accomplishing the high electrical output may be operated at high speeds.

A specific object of this invention is to provide a generator assembly comprised of a minimum number of simple metal stampings and other elements requiring a minimum of machining, which may be easily and accurately assembled.

Other objects and advantages will become apparent from a study of the following specification when considered in conjunction with the accompanying drawings, in which Figure 1 is a longitudinal sectional view of an ordnance fuse embodying this invention.

Fig. 5 is a longitudinal sectional view of an ordnance fuse embodying this invention.

Fig. 6 is a sectional view taken on the line VI—VI of Fig. 5, and

Fig. 7 is a sectional view taken on the line VII—VII of Fig. 5.

Figure 1:
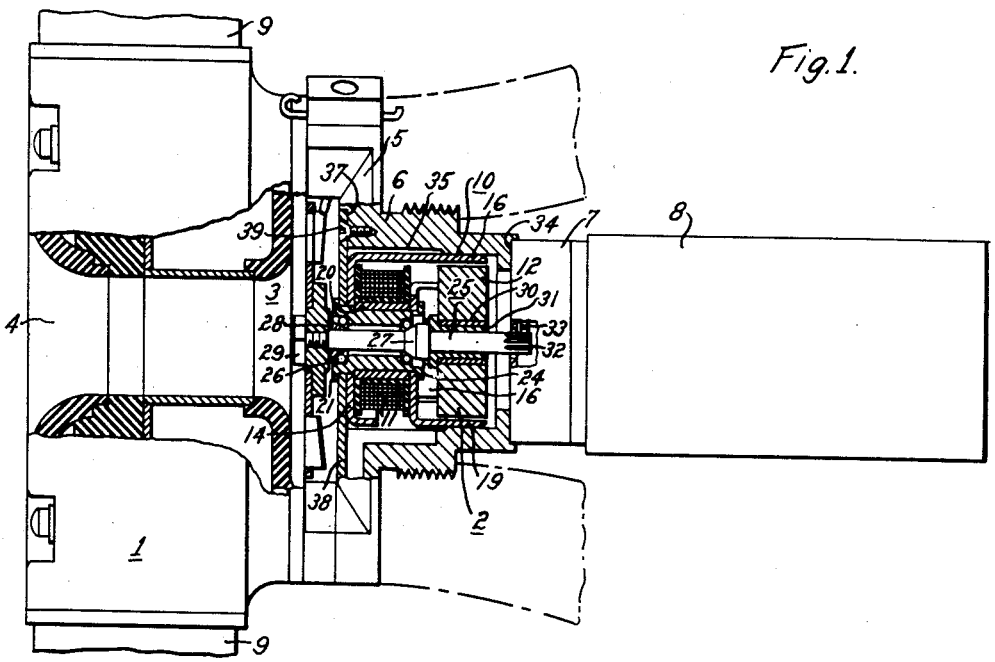
Figure 3:
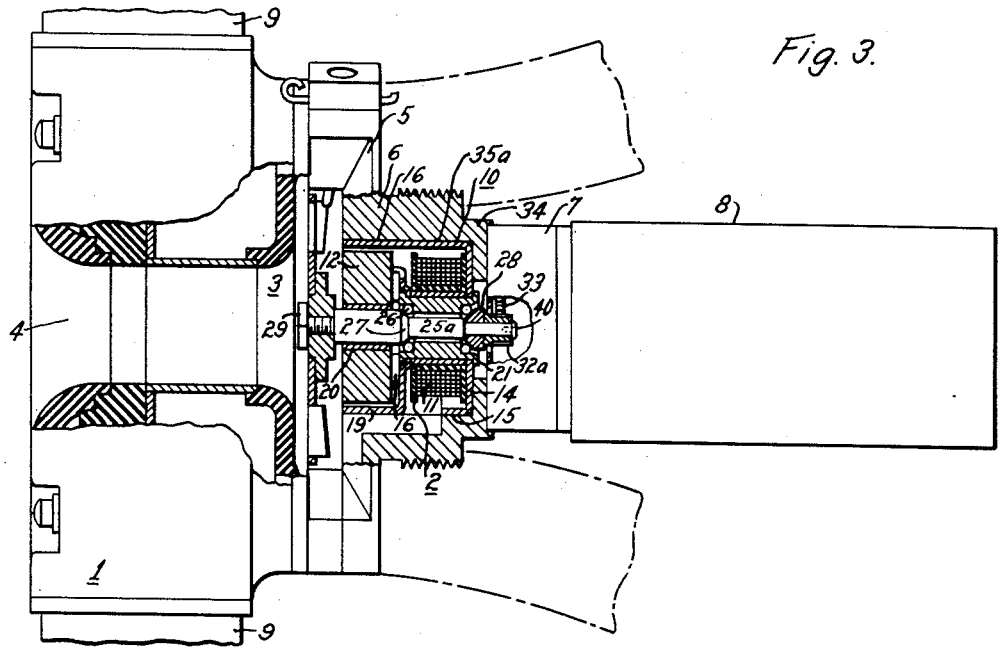
Fig. 3 is a longitudinal sectional view of an ordnance fuse illustrating a modification of this invention.

In general, fuses of the type illustrated in Figs. 1, 3 and 5 include a fuse head 1 (such head is not shown in Fig. 5 but is of the same type as that shown in either Figs. 1 or 3) which houses suitable electronic units for transmitting and receiving electrical signals, a generator 2 for energizing the electronic units, a turbine 3 for driving the generator, which turbine is operated by the airstream which flows through a suitable passage 4 through the fuse head 1 into the turbine and out of the fuse through radial passages such as the one designated 5 in the fuse body, a section 6 which houses the generator; a suitable gear reduction unit in the housing section 7, in Fig. 5 this housing is a portion of the fuse body 6 and is designated 6a, and an assembly of arming contacts, heater and associated squib and powder train disposed in the housing section 8 in Figs. 1 and 3 and 72 in Fig. 5.

The transmitted and reflected signals are applied along the dipoles or antenna 9, which are only fragmentarily shown, and the two signals are mixed in the electronic or radio units in the head 1 to produce a beat signal. The beat signal is amplified and passed to a trigger circuit where it is utilized to trigger, for example, a thyratron which when the beat signal amplitude is sufficient, indicating the fuse equipped projectile is near its target or objective, causes the thyratron to become conductive. The thyratron passes current through the mentioned heater which sets off the mentioned squib and associated powder train. The difference in frequency of the transmitted and reflected signals which makes a beat signal possible results from the physical phenomena generally known as the Doppler effect.

The foregoing discussion is very general in nature and is presented only for the purpose of clarifying the function of a device such as illustrated in Figs. 1 and 3. A more thorough treatment of these principles is given in the hereinbefore mentioned copending application of R. N. Harmon and E. J. Naumann. Reference may also be had to the copending application of Edward J. Naumann and Lloyd W. Clark, Serial No. 597,574, filed on the same date as this application, entitled Control Circuit, and also to a copending application of Harold P. Allen, Serial No. 597,569, now Patent No. 2,682,047, filed on the same date as this application, and entitled Control Circuit.

Figure 2:
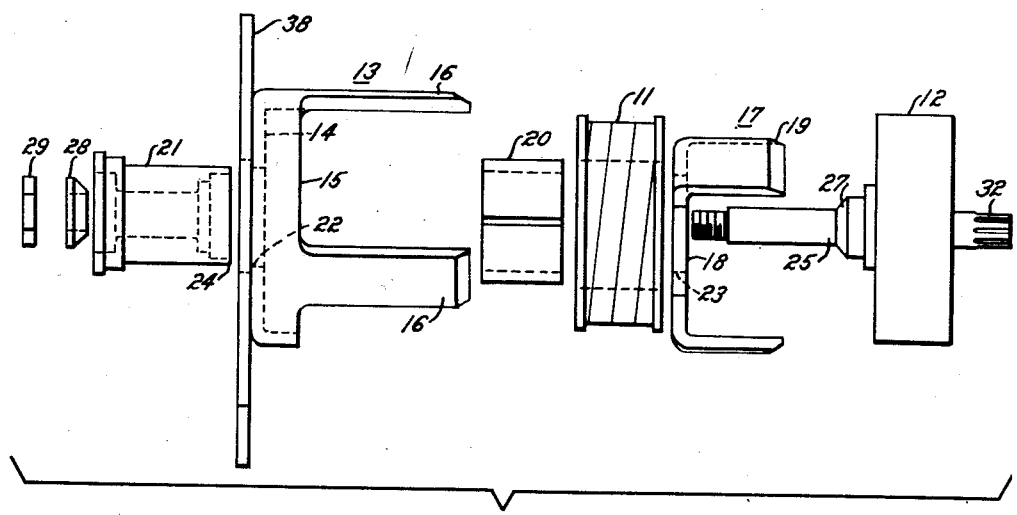
Fig. 2 is an exploded view of the generator illustrated in Fig. 1.

Referring now to Figs. 1 and 2, the generator illustrated therein includes generally a stator assembly 10 having six poles provided with a single coil assembly 11 and a permanent magnet rotor 12 which is magnetized for six alternate north and south poles.

Stator assembly 10 includes two extruded sections of sheet magnetic material. The section 13 includes a transverse portion 14 of circular plan form having pressed from the peripheral extremities thereof the circular wall portion 15 from which the three axially disposed and equally circumferentially spaced fingers or pole pieces 16 project. Section 17 includes a transverse plate 18 from which the fingers or pole pieces 19 project radially for a portion of their length and thence axially in equally spaced circumferential relation, with the fingers 19 defining a circle of a diameter equal to that of the fingers 16. The two stator sections 13 and 17 are disposed with the fingers thereof extending in the same axial direction from the associated transverse plates and arranged with the fingers in interlocking equally spaced circumferential relation, with the finger extremities terminating in a single transverse plane. Since the fingers 19, as illustrated, are of shorter length axially than the fingers 16, there results an axial spacing of the transverse plates 14 and 18 of the stator sections. This spacing is maintained by the split tubular spacer 20 disposed between the transverse plates with the extremities thereof in abutting relation to the transverse plates and the assembly is secured by means of the tubular core section 21 which slides through the coaxially arranged holes 22 and 23 in the transverse plates and the tubular spacer and is spun over or swaged at its extremity 24. The annular coil assembly 11 is disposed about the split tubular sleeve 20 between the transverse plates 14 and 18. A shaft 25 is journalled in bearings 26 and 18, located in bearing races formed in the extremities of the core section 21. An integral cone bearing surface 27 on the shaft, journals the shaft at one point while a cone bearing 28 slips over the threaded extremity of the shaft and engages the bearings at the opposite core extremity. This shaft assembly is secured by the hub of the turbine 3 which threads onto the shaft threads and seats against the shoulder on the shaft at the extremity of the cone bearing. This shoulder is so disposed that cone bearing 28 is drawn up the required amount for proper bearing operation. The turbine 3 is secured by lock nut 29. Permanent magnet rotor 12 is non-magnetically secured upon the shaft 25 by means of the spacers 30 and 31 for rotation within the pole circle formed by the circumferentially spaced fingers 16 and 19.

The magnetic circuit of this assembly, assuming north rotor poles adjacent the fingers 16, extends from the north rotor pole across the rotor-stator airgaps to the fingers 16, through such fingers to the transverse plate 14, thence through the core section 21 and split tubular spacer 20 to the transverse plate 18 and fingers 19 where the magnetic circuit is completed across the rotor-stator airgaps between the fingers 19 and the rotor south poles. Reversal of position of the rotor poles with respect to the fingers as occurs in rotor rotation reverses the flux direction from that just traced. As a consequence an alternating magnetic flux links the annular coil assembly 11 and induces alternating potentials therein.

It is essential that generators of the type described have similar electrical characteristics for similar operating conditions, otherwise special calibration of each fuse assembly to produce similar fuse response to a set objective proximity may result. Standardization of the electronic elements of the fuse can readily be obtained during their process of manufacturing. However, in the case of the generator, its operating characteristics can be no more closely regulated than manfacturing tolerances permit. In the case of metal stampings such as the stator sections 13 and 17, the tolerances are apt to be sufficiently large, particularly in the case of the radial dimensions of the position of the fingers 16 and 19 with respect to the axes of the respective sections. Large variations in output among several generators subjected to a given set of operating conditions may result from this source. Further it is essential that the generator axis is coincident with the fuse axis to insure proper meshing of the spur gear 32 formed on the end of the generator shaft opposite the turbine, with the first gear 33 of the gear reduction unit 7, which gear unit is coaxially arranged of the housing 6 in the recess 34 formed in the extremity thereof, and to obviate inclination of the turbine plane with respect to the axis of the air passage 4, otherwise aerodynamic unbalance of the turbine may result.

To this end, the housing 6 is provided with a cylindrical well 35 into which the assembled generator is insertable. This well at its extremity adjacent the turbine is of larger diameter than the stator sections 13 and 17 and is stepped down in diameter at its extremity adjacent the gear unit 7 to engage the extremities of the fingers 16 and 19. This reduced diameter portion of the housing is closely controlled in dimension by a suitable reaming operation. The axial face of the housing 6 adjacent the turbine has machined therein a recess 37 which is concentrically disposed of the axis of the well 35 and of suitable configuration, preferably circular, to receive the generator mounting plate 38 which is secured to the transverse plate 14 normal to the longitudinal axis of the stator section 13. Thus when the assembled generator is pressed into the well 35, the fingers 16 and 19 are pressed radially inwardly concentrically of the generator axis thereby fixing to a close dimensional tolerance the rotor-stator airgaps of the generator. The mounting plate 38 is concentrically located of the housing axis in the recess 37 and provides coincidence of the generator and housing axis. This assembly is secured by means of a plurality of screws, one of which appears at 39, which pass through the mounting plate 38 and threadedly engage the housing 6.

The simplicity of the component elements of the generator together with their ease of assembly is self evident in Fig. 2. Core section 21 is inserted through the central holes in station section 13 and plate 38 and split tubular member 20 and coil assembly 11 arranged thereabout with the stator section 17 fitting over the extremity of the core section 21 with its fingers equally circumferentially spaced of the fingers 16, after which a simple forming operation at 24 on core section 21 rigidly secures the assembly. Bearings 26 are arranged in the bearing races of the core section and the shaft 25 with the rotor 12 assembled thereon is inserted through the stator. Thereafter cone bearing 28 is slipped over the shaft and is suitably locked in position as by means of the turbine hub and the lock nut 29.

Figure 4:
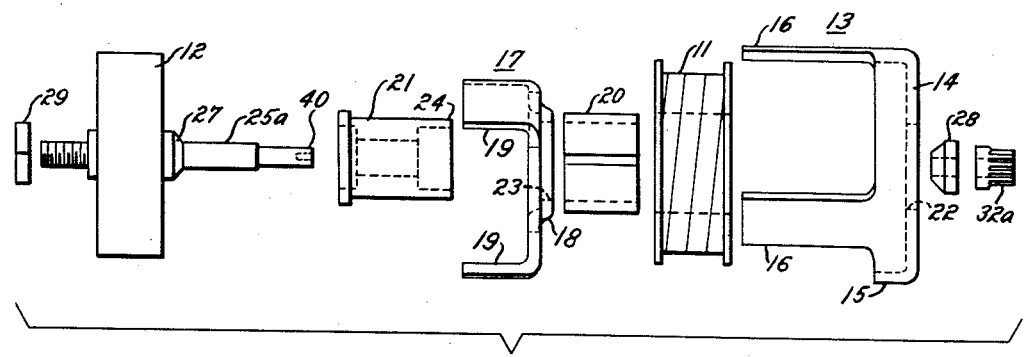
Fig. 4 is an exploded view of the generator illustrated in Fig. 3.

The embodiment of the invention illustrated in Figs. 3 and 4 of the drawing inverts the generator in the housing section 6 and in some measure simplifies the general construction and assembly. Physically this assembly differs only in the matter of a few details over that in the assembly of Figs. 1 and 2. Electrically there is no new or changed result. Parts in Figs. 3 and 4 having structural similarity and function to those of Figs. 2 and 3 have been given like reference characters. Others which have been modified have added thereto the suffix "a." For the most part this embodiment of the invention will be understood from the discussions hereinbefore made.

It will be noted that this assembly of the generator eliminates the mounting plate 38 of the preceding assembly. The well 35a is now machined to a close positive tolerance with the diameter of the generator stator sections throughout its length. Stator assembly 10 is now assembled by inserting the core section 21 through stator section 17, then assembling the split tubular member 20 and the coil assembly 11 thereabout with stator section 13 fitting over the end of the core section 21 after which the forming operation at 24 secures the assembly. After assembly of the bearings in the recess at the extremities of core section 21 the shaft 25a with rotor 12 secured thereon is inserted through the stator where it is secured for rotation by cone bearing 28 which now abuts the shoulder on the generator shaft and which in turn is securely held in position by spur gear 32a in abutting relation therewith by flanging of the generator shaft extremity at 40 against the spur gear.

This generator assembly is pressed into the well 35a coil end first and the extremities of the fingers 16 and 19 are accurately radially arranged about the rotor 12. In this position, the rotor is adjacent the turbine 3 and while a separate assembly of the turbine and generator rotor are shown, it is, of course, apparent that the rotor, by way of being supported in a suitable mold, may be diecast as a unit with the turbine 3. Such expedients, however, are well known in the art and require no detailed illustration or description.

Generators of the type described for this specific fuse application are subjected to high speed operation, since the turbine speeds range as high as 40,000 R. P. M. or higher. Thus it has been found desirable to utilize rotors having smooth peripheries, a factor which greatly improves structural strength and minimizes windage losses at the same time. Such rotors are conveniently formed of a magnetic combination of aluminum, nickel, cobalt and iron commonly known as Alnico. The rotors are magnetized by the application thereto of strong unidirectional magnetic fields, alternate north and south about the rotor periphery. This produces highly magnetized alternate north and south poles about the rotor and deterioration of the magnetic fields with time is negligible.

A refinement of the invention illustrated in Figs. 1 through 4 appears in Figs. 5 through 7. Here again, much of the invention particularly with respect to the generator will be understood in connection with the discussion directed to the preceding figures of the drawing. Parts which are similar to those of the preceding figure again carry like reference characters.

The generator mounting except for the journalling of the rotor shaft is similar to that shown in Fig. 1. The shaft is journaled in the bearings 45 and 46, of which the bearing 45 is carried in the core extremity adjacent the plate 38 while the bearing 46 is journalled in a section of the housing 47 forming a wall between the generator and gear unit. This arrangement greatly reduces the system vibration, since, a more stable shaft mounting is provided in that the shaft overhang of the bearings with respect to the point of engagement thereof with the gear unit is minimized.

The generator shaft 25b projects into the gear reduction unit housed in suitable cavities in the extension 6a of the fuse body 6 and therein terminates in a worm 48. Worm 48 meshes with worm wheel 49 rotatably secured with the worm 50. Worm 50 drives the worm wheel 51 rotatably secured with the worm 52 which, in turn, meshes with the worm wheel 53 securely joined to the output shaft 54. Output shaft 54 is journaled in the sleeve 55 secured as an insert in the circular member 56 formed of insulating material and securely concentrically positioned of the housing axis to assure proper meshing of worm wheel 53 with worm 52, by means of the recess 57 formed in the axial face of the housing section 6a. The extremity of the output shaft 54 opposite the worm wheel 53 is provided with a keyway 58 and has journaled thereon a small rotor 59 of insulating material keyed to rotate with the output shaft by means of the spring biased plunger 60 carried in the tubular insert 61 radially disposed of the rotor. Plunger 60 is maintained in keyed relation with the output shaft by the tubular section 62 which in the position shown restrains the plunger from radial movement. One end of the cylindrical section 62 is partially enclosed at 63 and at this extremity mates with complementary portions of the circular member 56.

The member 56 and section 62 are securely joined by screws 69 which pass through the portion 63 of section 62 and the member 56 and which thereafter thread into the end of the housing 6a. A squib 64 consisting of a heater 65 buried in a powder charge in a metal container is secured in the small rotor 59 and has the heater lead wires 65a connected to the two contact screws 66 projecting from the axial face 67 of the rotor 59. Spring contact members 68 secured by rivets 70 to the circular member 56 bear against the axial face 67. The positioning of the various contacts are illustrated in Figs. 6 and 7. Electrical energy is supplied to the contacts 68 from the radio units as previously explained by means of wires (not shown) which extend from the radio units in the fuse head through the passage 71 and connect to the contacts 68. This entire assembly of the arming contact units is enclosed in a metal tube 72 which threads over the extremity of housing section 6a. The other extremity of the tube 72 is internally threaded to receive the container assembly 73 carrying a powder charge commonly known as the tetrobooster. The end of this container is closed by the heavy barrier 74 positioned in close proximity to the face of the contact carrying rotor 59. A hole 75 extends through the barrier.

Upon operation of the turbine, the output shaft 54 is rotated driving the rotor 59 in rotation to its final position in which the contacts 66 engage the contacts 68. The rotor is locked in this position by the plunger 69 which moves radially into the slot 76 in the cylindrical section 62 and at the same time disengages the keyway 58 in the output shaft 54. Squib 64 is coaxially aligned with the hole 75 through the barrier 74. The arming circuit to the heater 65 is thus completed. When the radio units energize the heater the powder charge in squib 64 is ignited. The resulting blast is communicated to the tetrabooster charge through the hole 75. Explosion of this main powder charge of the fuse ignites the high explosive charge of the projectile.

A fuse assembly of the type described offers numerous advantages. In the first place, the stability of the generator shaft as now journaled together with the worm gear type of drive for the output shaft secured in a heavy, single-piece continuation of the fuse housing minimizes vibration. With the assembly in Fig. 1, which fragmentarily shows a spur gear reduction drive, high frequency mechanical vibrations at the gear unit, in some applications, are sensed by the radio units and, if in the frequency range of the beat signal which controls fuse ignition, may cause premature explosion of the fuse.

The squib 64 contains a relatively small powder charge, however, the force of its explosion is considerable. It also is connected to the energizing circuits therefor prior to the time the rotor reaches its final angular position, a condition which results from the physical arrangement of the contacts to insure positive wiping contact action. Contacts 66 carried by the rotor 59 project from the axial face 67, and hence pick up the contacts 69 before the final angular position of the rotor obtains. Should a discharge of current into the heater occur at this time as a result of faulty fuse operation, the squib would explode. Detonation of the projectile at this time, however, is largely obviated since the squib is yet sufficiently displaced from the hole 75 that the blast is not likely to pass therethrough. Further, the squib is not sufficiently powerful to burst the tubular member 72 and thereby ignite the high explosive which surrounds the fuse.

The foregoing disclosure and the showings made in the drawings are merely illustrative of the principles of this invention and are not to be interpreted in a limiting sense. The only limitations are to be determined from the scope of the appended claims.

We claim as our invention:
1. A generator assembly comprising, in combination, a first stator section including a transverse section of circular configuration having a plurality of finger-like members extending axially from the periphery thereof in circumferentially spaced relation, a second stator section including a transverse section having a plurality of finger-like members extending radially therefrom for a portion of their length and thence in an axial direction, the finger-like members of said second stator section and of shorter axial dimension, said first and second stator sections being disposed in coaxial relation with, the finger-like members thereof in circumferentially spaced interlocking relation and extending in the same axial direction from the transverse sections, said finger-like members of the first and second stator sections terminating in the same transverse plane, each of said transverse sections having holes centrally thereof, a tubular core section extending through said holes and securely joining the transverse sections, a coil assembly encircling the tubular core section, a shaft journaled in the tubular core section, a permanent magnet rotor secured to said shaft to rotate within the pole circle formed by said finger-like members, a plate secured to the transverse section of the first stator section, a housing of non-magnetic material having a cylindrical opening therein terminating in a reduced diameter cylindrical portion, said generator being insertable into said cylindrical opening with said plate abutting the axial extremity of said housing in which position the extremities of said finger-like members fit into said reduced diameter cylindrical portion of the housing wherein they are accurately radially spaced with respect to said rotor.

2. A generator assembly comprising, in combination, a first stator section including a transverse section of circular configuration having a plurality of finger-like members extending axially from the periphery thereof in circumferentially spaced relation, a second stator section including a transverse section having a plurality of finger-like members extending radially therefrom for a portion of their length and thence in an axial direction, the finger-like members of said second stator section being equal in number to those of the first stator section and of shorter axial dimension, said first and second stator sections being disposed in coaxial relation with the finger-like members thereof in circumferentially spaced interlocking relation and extending in the same axial direction from the transverse sections, said finger-like members of the first and second stator sections terminating in the same transverse plane, each of said transverse sections having holes centrally thereof, a tubular core section extending through said holes and securely joining the transverse sections, a coil assembly encircling the tubular core section, a shaft journaled in the tubular core section, a permanent magnet rotor secured to said shaft to rotate within the pole circle formed by said finger-like members, a circular plate secured to the transverse section of the first stator section, a housing of non-magnetic material having a cylindrical opening therein terminating in a reduced diameter cylindrical portion, a circular recess in the face of said housing concentrically of said cylindrical opening having a diameter to receive said circular plate, said generator being insertable into said cylindrical opening with said circular plate fitting into said circular recess and abutting the extremity of said housing, in which position the extremities of said finger-like members fit into said reduced diameter cylindrical portion and are squeezed inwardly towards the periphery of said rotor whereby they are accurately radially positioned with respect to said rotor.

References Cited in the file of this patent
UNITED STATES PATENTS

| Number | Name | Date |
|---|---|---|
| 1,966,897 | Lofgren | July 17, 1934 |
| 1,993,825 | Bohli | Mar. 12, 1935 |

FOREIGN PATENTS

| Number | Country | Date |
|---|---|---|
| 477,835 | Great Britain | Jan. 3, 1938 |